(12) United States Patent
Marinkovich et al.

(10) Patent No.: US 6,209,208 B1
(45) Date of Patent: Apr. 3, 2001

(54) KEYLESS BLADE CLAMP MECHANISM

(75) Inventors: Dragomir C. Marinkovich, Butler; Roger Dean Neitzell, North Prairie, both of WI (US)

(73) Assignee: Milwaukee Electric Tool Corporarion, Brookfield, WI (US)

( * ) Notice: Subject to any disclaimer, the term of this patent is extended or adjusted under 35 U.S.C. 154(b) by 0 days.

(21) Appl. No.: 09/169,398

(22) Filed: Oct. 9, 1998

(51) Int. Cl.⁷ .................................................. B27B 19/09
(52) U.S. Cl. ........................ 30/392; 30/338; 30/337; 30/339; 30/342; 271/81; 271/71
(58) Field of Search ........................ 30/392, 339, 393, 30/394, 337, 342, 338; 279/81, 71

(56) References Cited

U.S. PATENT DOCUMENTS

| | | | |
|---|---|---|---|
| Re. 36,269 | * 8/1999 | Wright | 279/90 |
| 3,583,716 | 6/1971 | Daniel, Jr. | 279/81 |
| 3,750,283 | 8/1973 | Hoffman | 30/338 |
| 3,823,473 | 7/1974 | Hoffman | 30/338 |
| 3,964,163 | 6/1976 | Russo | 30/166 R |
| 4,020,555 | 5/1977 | Hedrick | 30/392 |
| 4,083,112 | 4/1978 | Palm | 30/335 |
| 4,106,181 | 8/1978 | Mattchen | 29/450 R |
| 4,204,692 | 5/1980 | Hoffman | 279/81 |
| 4,285,129 | 8/1981 | Hoffman | 30/392 |
| 4,294,013 | 10/1981 | Krieg | 30/392 |
| 4,299,402 | 11/1981 | Hoffman | 279/75 |
| 4,351,112 | 9/1982 | Nalley | 30/392 |
| 4,441,225 | 4/1984 | Hoffman | 30/392 |
| 4,470,196 | 9/1984 | Hoffman | 30/392 |
| 4,528,753 | 7/1985 | Kuhlmann et al. | 30/392 |
| 4,550,500 | 11/1985 | Kuhlmann et al. | 30/392 |
| 4,594,781 | 6/1986 | Hoffman | 30/392 |
| 4,601,477 | 7/1986 | Barrett et al. | 279/30 |
| 4,648,182 | 3/1987 | Hoffman | 30/392 |
| 4,691,929 | * 9/1987 | Neumaier et al. | 279/19.3 |
| 4,708,548 | * 11/1987 | Taylor et al. | 409/234 |
| 5,058,280 | 10/1991 | Pollak et al. | 30/392 |
| 5,103,565 | 4/1992 | Holzer, Jr. | 30/392 |
| 5,165,173 | 11/1992 | Miller | 30/392 |
| 5,233,892 | 8/1993 | Roberts | 81/177.85 |
| 5,272,948 | 12/1993 | Theising | 83/786 |
| 5,306,025 | 4/1994 | Langhoff | 279/90 |
| 5,322,302 | 6/1994 | Quirijnen | 279/22 |
| 5,324,052 | 6/1994 | Ortmann | 279/83 |

(List continued on next page.)

FOREIGN PATENT DOCUMENTS

| | | | |
|---|---|---|---|
| 3713208 | 11/1988 | (DE) | B27B/19/00 |
| 0544129 | 6/1993 | (EP) | B23D/51/10 |
| 0623413 | 11/1994 | (EP) | B23D/51/10 |
| 2296888 | 7/1996 | (GB) . | |
| WO89/08524 | 9/1989 | (WO) | B23D/51/10 |
| WO95/27583 | 10/1995 | (WO) | B23D/51/10 |

*Primary Examiner*—Boyer Ashley
(74) *Attorney, Agent, or Firm*—Michael Best & Friedrich LLP

(57) ABSTRACT

A reciprocating tool (e.g., a reciprocating saw) comprising a housing, a spindle mounted for reciprocating movement within the housing and having an end adapted to receive a saw blade, and a blade clamp mechanism connected to the spindle and adapted to attach a saw blade to the spindle. The blade clamp mechanism includes an actuating member mounted on the end of the spindle and capable of moving relative to the spindle between an engaged position and a disengaged position, and a locking member operatively associated with the actuating member and moveable relative to the spindle between a locked position that locks a saw blade to the spindle and an unlocked position that releases the saw blade. Movement of the actuating member from the disengaged position to the engaged position results in forced movement of the locking member from the unlocked position to the locked position, and movement of the actuating member from the engaged position to the disengaged position results in forced movement of the locking member from the locked position to the unlocked position.

15 Claims, 5 Drawing Sheets

U.S. PATENT DOCUMENTS

| | | | |
|---|---|---|---|
| 5,340,129 | 8/1994 | Wright | 279/90 |
| 5,351,590 | 10/1994 | Everts et al. | 83/699.21 |
| 5,363,733 | 11/1994 | Baird et al. | 83/786 |
| 5,402,580 | 4/1995 | Seto et al. | 30/394 |
| 5,421,232 | 6/1995 | Laverick | 83/699.21 |
| 5,433,457 | 7/1995 | Wright | 279/90 |
| 5,439,472 | 8/1995 | Evans et al. | 606/176 |
| 5,443,276 | 8/1995 | Nasser et al. | 279/77 |
| 5,458,346 | 10/1995 | Briggs | 279/97 |
| 5,487,221 | 1/1996 | Oda et al. | 30/392 |
| 5,575,071 | 11/1996 | Phillips et al. | 30/392 |
| 5,903,983 * | 5/1999 | Jungmann et al. | 30/392 |
| 5,934,846 | 8/1999 | Ishii . | |
| 5,946,810 | 9/1999 | Hoelderlin et al. . | |
| 5,954,347 | 9/1999 | Buck et al. . | |
| 5,971,403 | 10/1999 | Yahagi et al. . | |
| 5,984,596 | 11/1999 | Fehrle et al. . | |
| 5,987,758 * | 11/1999 | McCurry et al. | 30/392 |
| 5,988,034 * | 11/1999 | Okuba et al. | 83/699.21 |
| 5,988,957 | 11/1999 | Wheeler . | |
| 5,989,257 | 11/1999 | Tidwell et al. . | |
| 5,996,452 | 12/1999 | Chiang . | |

* cited by examiner

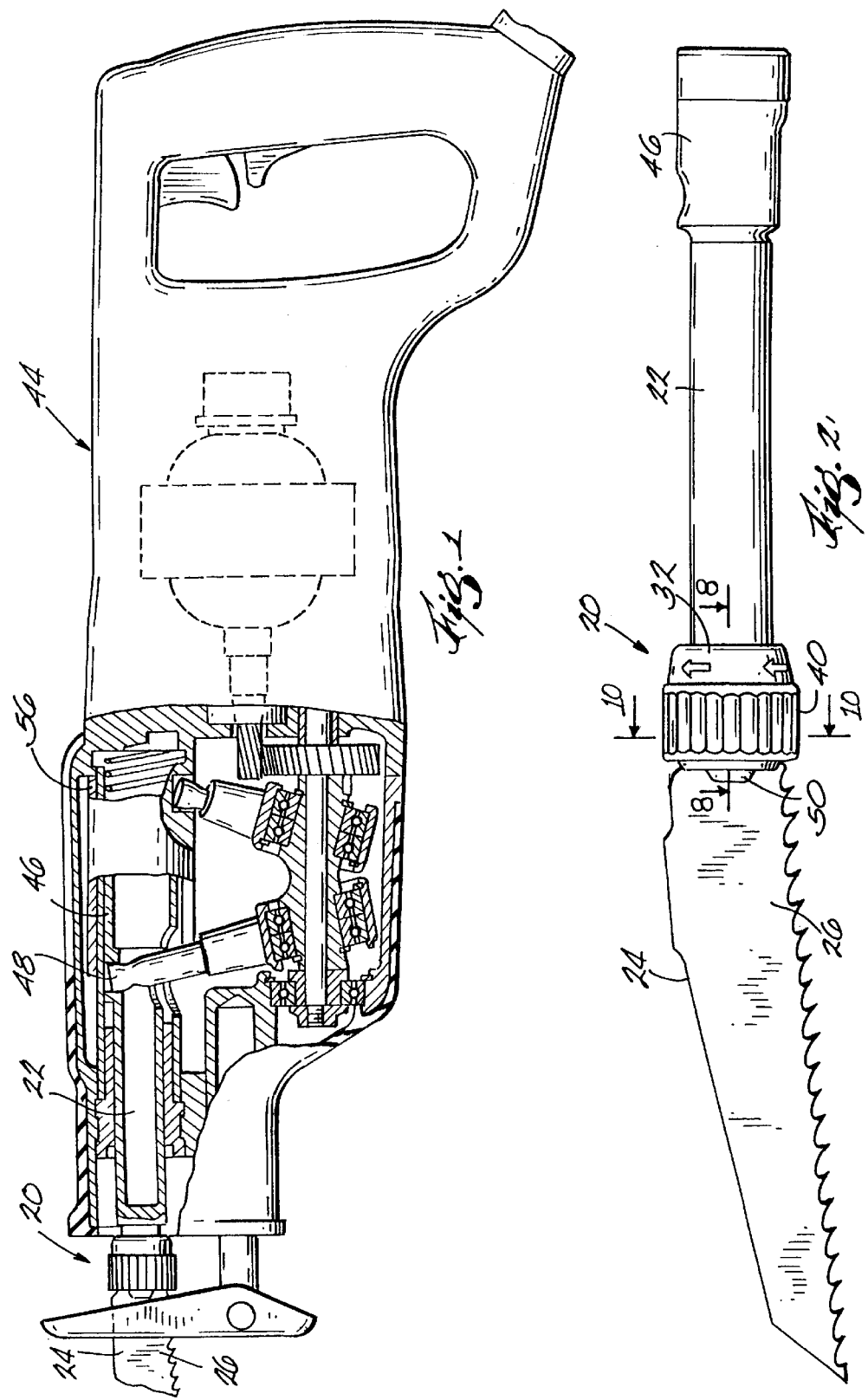

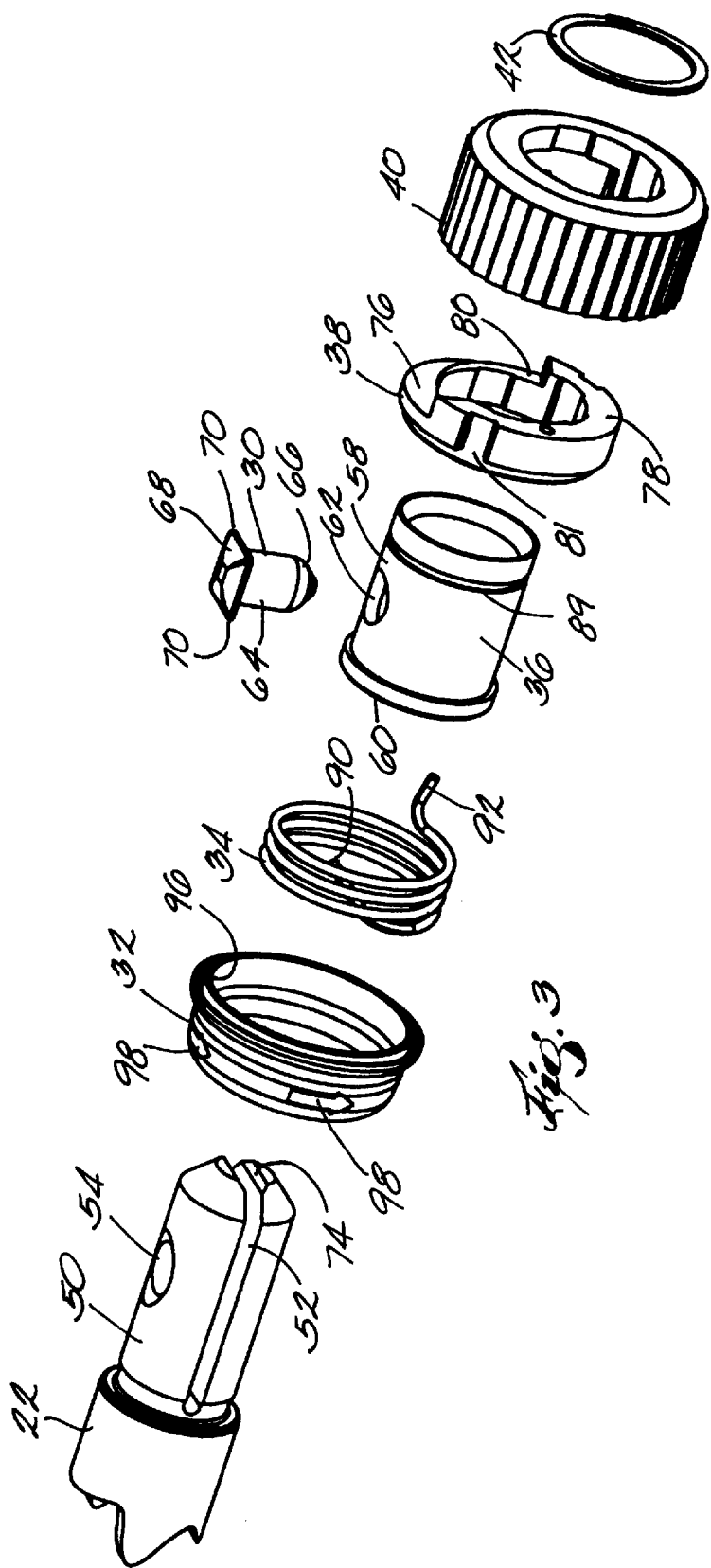

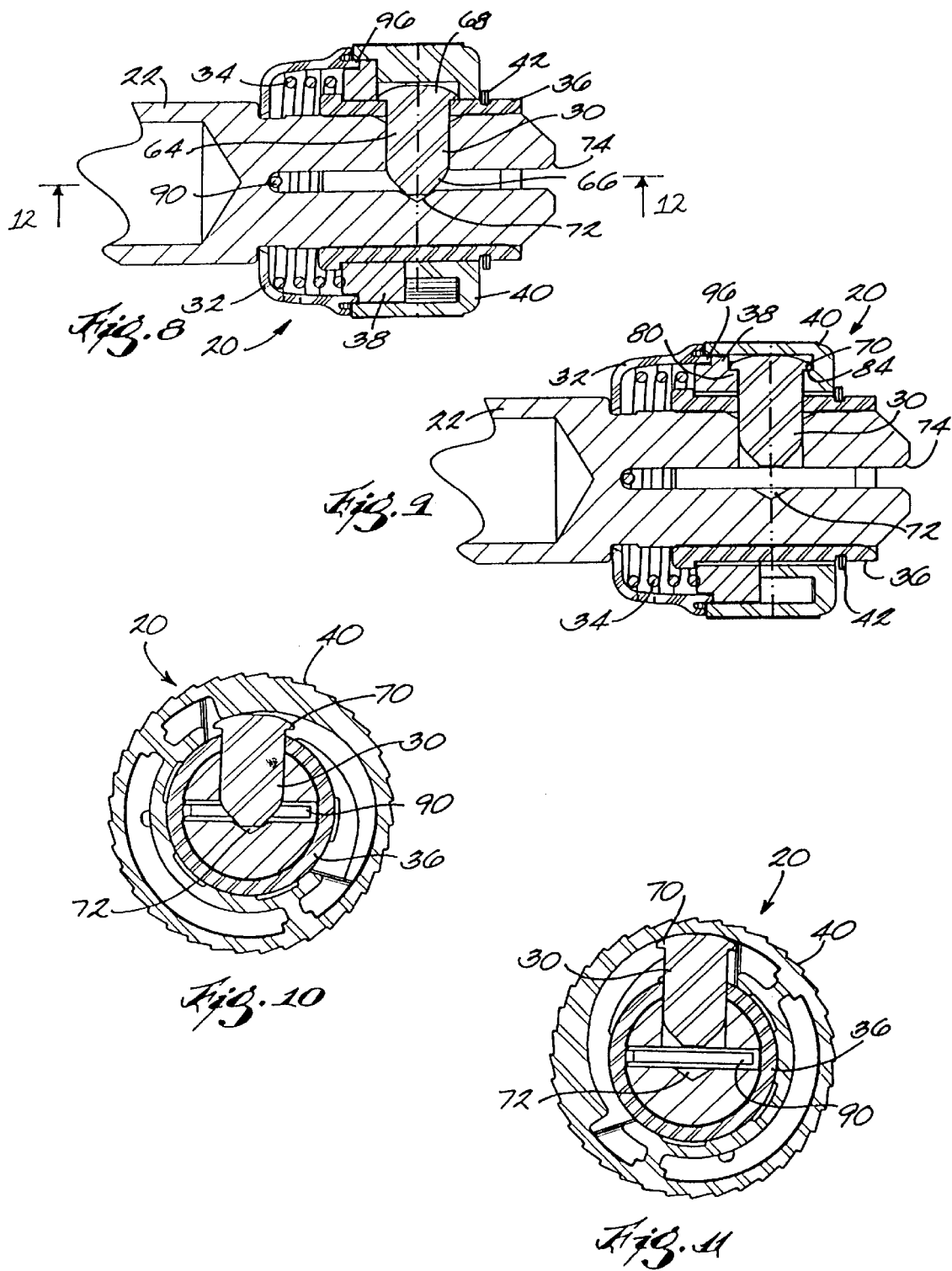

KEYLESS BLADE CLAMP MECHANISM

FIELD OF THE INVENTION

The present invention relates to reciprocating saws and more specifically to a keyless blade clamp for quickly and easily replacing and securing a saw blade to a spindle of a reciprocating saw.

BACKGROUND OF THE INVENTION

Hand held reciprocating tools, such as electric reciprocating saws, include removable blades, which permits the use of different cutting edges as may be necessary for cutting different materials and for the replacement of worn or damaged blades. This requires a blade mounting system that allows rapid blade replacement while accurately and firmly coupling the blade to the tool. Typically, blade mounting systems require a tool, such as an allen wrench or a special key, in order to replace and secure the blade. This is a slow and often difficult process.

Recently, blade clamps that do not require a tool have been developed. These clamps are commonly called keyless blade clamps. While many existing keyless blade clamps are a vast improvement over standard blade clamps that require tools, there is still a need for keyless blade clamps that are easy to manufacture, simple to use, and long-lasting.

SUMMARY OF THE INVENTION

The present invention provides a reciprocating tool (e.g., a reciprocating saw) comprising a housing, a spindle mounted for reciprocating movement within the housing and having an end adapted to receive a saw blade, and a blade clamp mechanism connected to the spindle and adapted to attach a saw blade to the spindle. The blade clamp mechanism includes an actuating member mounted on the end of the spindle and capable of moving relative to the spindle between an engaged position and a disengaged position, and a locking member operatively associated with the actuating member and moveable relative to the spindle between a locked position that locks a saw blade to the spindle and an unlocked position that releases the saw blade. Movement of the actuating member from the disengaged position to the engaged position results in forced movement of the locking member from the unlocked position to the locked position, and movement of the actuating member from the engaged position to the disengaged position results in forced movement of the locking member from the locked position to the unlocked position. By virtue of the forced movement of the locking member to the unlocked position, the locking member is moved at least partially out of the way of the saw blade to thereby reduce interference between the locking member and the saw blade.

In one embodiment, the actuating member includes an outer cam surface and an inner cam surface, and the locking member includes outer follower surface adapted to be driven by the outer cam surface and an inner follower surface (e.g., a shoulder portion) adapted to be driven by the inner cam surface. Preferably, the inner cam surface includes a front portion and a rear portion axially spaced from the front portion. In this situation, the locking member can be positioned between the front portion and the rear portion.

The present invention also provides a method of inserting a saw blade into a reciprocating saw having a spindle and a blade clamp mechanism connected to the spindle, the blade clamp mechanism including an actuating member movably mounted on an end of the spindle and a locking member operatively associated with the actuating member. The method comprises the steps of providing the saw with the actuating member in an engaged position and with the locking member in a locked position, moving (e.g., rotating) the actuating member to a disengaged position, contacting the actuating member with the locking member during the moving step to thereby force the locking member to move to an unlocked position, inserting a saw blade into the spindle, returning the actuating member back to the engaged position, and forcing the actuating member to contact and move the locking member into the locked position and into engagement with the saw blade.

In one embodiment, the actuating member includes a cam surface, and the contacting step includes engaging the cam surface with the locking member. Preferably, the locking member includes a body portion and a head portion larger than the body portion, and the engaging step includes engaging the cam surface with the head portion.

BRIEF DESCRIPTION OF THE DRAWINGS

FIG. 1 is a partially-section side view of a reciprocating saw embodying the present invention.

FIG. 2 is a side view of the spindle and blade clamp mechanism of FIG. 1.

FIG. 3 is an exploded perspective assembly view of the spindle and blade clamp mechanism of FIG. 2.

FIG. 8 is an axial section view taken along line 8—8 in FIG. 2 with the mechanism engaged.

FIG. 9 is the section view of FIG. 8 with the mechanism disengaged.

FIG. 10 is a lateral section view taken along line 10—10 in FIG. 2 with the mechanism engaged.

FIG. 11 is the section view of FIG. 10 with the mechanism disengaged.

DETAILED DESCRIPTION OF THE ILLUSTRATED EMBODIMENT

Figure 7:
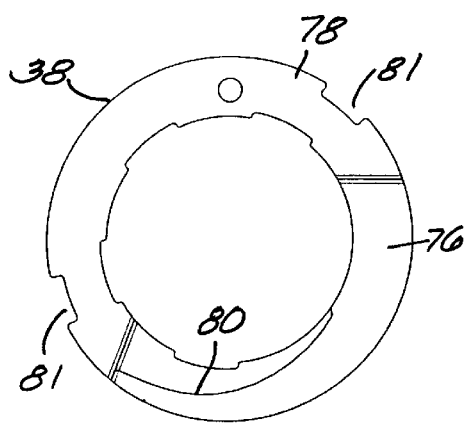
FIG. 7 is a front view of the rear cam member.

FIGS. 1–3 and 8–11 illustrate a keyless blade clamp mechanism 20 embodying the present invention. The illustrated mechanism 20 is shown mounted on a reciprocatable spindle 22, and in FIGS. 2 and 7–10 is shown engaging a saw blade 24 having a main portion 26 and a tang 28. Briefly, the blade clamp mechanism 20 includes a pin 30, a spring cover 32, a spring 34, a sleeve 36, a rear cam member 38, a front cam member 40, and a retainer clip 42.

The spindle 22 is adapted to be mounted for reciprocation within the body of a reciprocating saw 44. A drive portion 46 is adapted to be driven by a wobble plate 48, as is generally known in the art (FIGS. 1 and 2). The spindle 22 includes a spindle tip 50 having a slot 52 dimensioned to receive the saw blade 24, and a tip orifice 54 extending laterally from an outer surface of the spindle tip 50 to the slot 52 (FIG. 3). A compression spring 56 (FIG. 1) is provided to bias the spindle 22 toward an extended position relative to the body of the reciprocating saw.

The sleeve 36 is positioned around the spindle tip 50, and includes a cylindrical body portion 58 and a flange 60

(FIGS. 3 and 8–11). The inner diameter of the body portion 58 is dimensioned to receive the spindle tip 50. The body portion 58 includes a sleeve orifice 62 that is aligned with the spindle orifice 54.

The pin 30 is slidably positioned within the sleeve orifice 62 and the tip orifice 54. Referring specifically to FIG. 8, the pin 30 includes a cylindrical portion 64 and a conical portion 66 with a surface angled at about 45° relative to the surface of the cylindrical portion 64. The pin 30 further includes a head portion 68 that defines a shoulder 70 that facilitates lifting the pin 30, as described below in more detail. The head portion 68 is square in cross section (FIG. 3). As shown in FIGS. 8–11, the spindle 22 further includes a drill point 72 in the form of a recess adapted to receive the end of the pin 30 if the pin 30 extends through the slot 52. This may occur, for example, when the pin 30 engages a saw blade 24 that is relatively thin.

As shown in FIGS. 2, 8, and 9, the Spindle tip 50 extends axially beyond the end of the sleeve 36. This is believed to provide additional support to the saw blade 24, particularly forward of the tang 28, resulting in reduced blade breakage. In addition, the spindle tip 50 includes a chamfered or radiused tip 74 (FIGS. 8 and 9). The chamfered or radiused tip 74 is also believed to reduce blade breakage.

Figure 6:
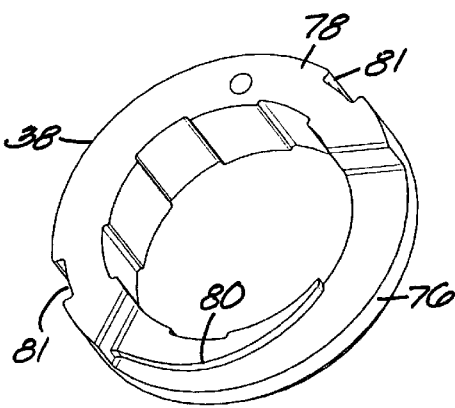
FIG. 6 is a perspective view of a rear cam member of the mechanism of FIG. 2.

The rear cam member 38 is rotationally positioned over the sleeve 36. The flange 60 of the sleeve 36 limits axial movement of the rear cam member 38 in the rearward direction. Referring to FIGS. 3, 6, and 7, the rear cam member 38 includes a base portion 76, a raised portion 78, and a rear cam surface 80. The rear cam surface 80 is positioned to act as an inner cam surface when it engages the shoulder 70 of the pin 30 to thereby facilitate movement of the pin 30 radially outward, as described below in more detail. Slots 81 are formed on the outer diameter of the rear cam member 38.

Figure 4:
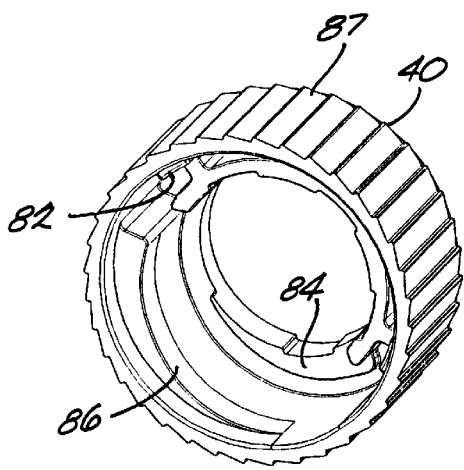
FIG. 4 is a perspective view of a front cam member of the mechanism of FIG. 2.
Figure 5:
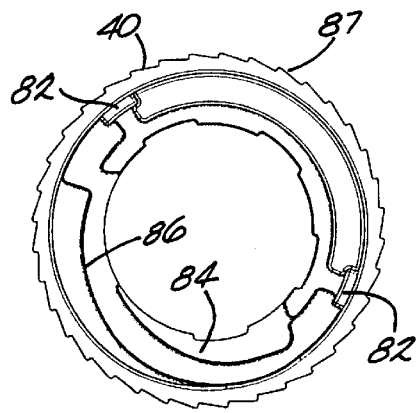
FIG. 5 is a rear view of the front cam member.

The front cam member 40 (FIGS. 4 and 5) is rotatably positioned over the sleeve 36 and in engagement with the rear cam member 38. In this regard, the raised portion 78 of the rear cam member 38 is positioned within the front cam member 40 such that the slots 81 engage the splines 82 formed on the inner diameter of the front cam member 40. The front cam member 40 includes a front cam surface 84 in axially-spaced, opposing relation to the rear cam surface 80. Similar to the rear cam surface 80, the front cam surface 84 is positioned to act as an inner cam surface when it engages the shoulder 70 of the pin 30 to thereby facilitate movement of the pin 30 radially outward. The front and rear cam surfaces 80,84 provide balanced forces on the pin 30 (FIG. 9).

The front cam member 40 further includes an outer cam surface 86 positioned radially outward from the pin 30. The outer cam surface 86 cooperates with the pin 30 to selectively move the pin 30 inward toward the slot 52 to engage the saw blade 24, as described below in more detail. The outer cam surface 86 radially cams the outer surface of the head portion 68 at the same rate as the inner cam surfaces 80,84 to facilitate smooth movement of the pin 30.

The front cam member 40 is provided with an outer gripping surface 87 having a unidirectional pattern in the rotational direction (FIGS. 4, 5, 10 and 11). That is, the pattern on the gripping surface 87 provides greater friction to a user's hand when attempting to rotate in one direction compared to the opposite direction. For example, in the illustrated embodiment, the pattern involves a series of repeating ramps that have different ramp angles. In this embodiment, the friction encountered when rotating the mechanism 20 from a static, engaged condition to the released condition is greater than the friction that would be encountered if the user were to try to rotate the mechanism 20 in the opposite direction. This feature can help to reduce the chance of damage that may be caused by forcing the mechanism to turn in the wrong direction.

The retainer clip 42 engages a groove 89 in the sleeve 36 to retain the entire assembled mechanism 20 mounted on the tip of the spindle tip 50 (FIGS. 3, 8, and 9).

The rear and front cam members 38,40 are collectively rotatable relative to the spindle 22 between an engaged position (FIGS. 8 and 10), where the pin 30 is forced toward the slot 52, and a disengaged position (FIGS. 9 and 11), where the pin 30 is forced away from the slot 52. In this way, the rear and front cam members 38,40 constitute an embodiment of an actuating member that is operatively associated with the pin 30, which constitutes a locking member.

The spring 34 (FIGS. 3 and 8–11) is positioned to the rear of the rear cam member 38. The spring 34 includes a rear leg 90 positioned within the slot 52, and a front leg 92 positioned within an orifice 94 in the rear cam member 38. The spring 34 is thereby interconnected with the rear cam member 38 for biasing the blade clamp mechanism 20. The spring 34 constitutes an embodiment of a biasing member and is positioned to bias the actuating member (e.g., the rear and front cam members 38,40) toward the engaged position.

The spring cover 32 (FIGS. 3 and 8–11) is rotatably positioned over the spindle tip 50. The spring cover 32 encloses a substantial portion of the spring 34, and thereby prevents outside contaminants from entering the spring and affecting the action of the spring. Contaminants, such as bits of material thrown off by the saw, between the coils of the spring could prevent proper action of the spring. the spring cover 32 includes a front lip 96 that fits within the inner edge of the front cam member 40. The spring cover 32 can further include markings (e.g., arrows 98) that indicated the proper direction for rotation of the mechanism 20 from the static condition.

Figure 12:
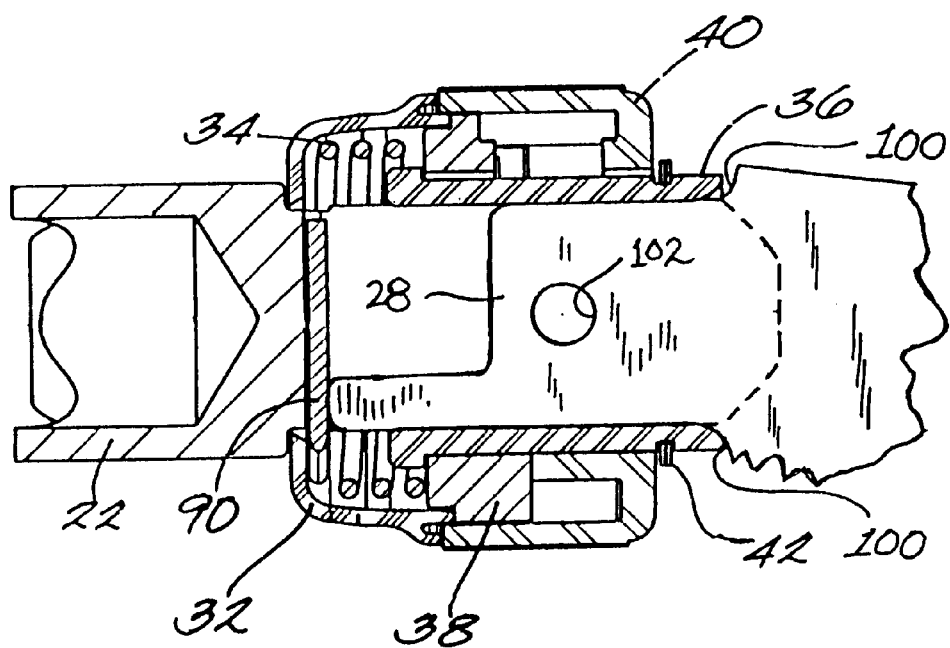
FIG. 12 is a section view taken along line 12—12 in FIG. 8.

The saw blade 24 includes two shoulder portions 100 (FIG. 12) that form the transition from the tang 28 to the main portion 26. When the blade 24 is inserted into the slot 52, the shoulder portions 100 will engage the sleeve 36 at two locations. The blade 24 further includes a hole 102 into which the pin 30 will be inserted to facilitate engagement of the blade 24.

In operation, before a saw blade is inserted, the rear and front cam members 38,40 are normally in the engaged position due to the biasing action of the spring 34. To insert a saw blade 24, cam member 38,40 is engaged by the user and rotated to the released position, which engages the inner cam surfaces with the shoulder of the pin 30 and forces the pin 30 to move out of the slot 52. The tang 28 of the saw blade 24 is then inserted into the slot 52 until the shoulder portions 100 of the saw blade 24 contacts the sleeve 36. The rear and front cam members 38,40 are then allowed to rotate back to the engaged position due to the biasing force of the spring 34. When moving from the released position to the engaged position, the outer cam surface 86 of the front cam member 40 forces the pin 30 to move into the hole 102 in the saw blade 24, thereby causing the saw blade 24 to be fixedly clamped by the mechanism 20.

The saw blade 24 is released by rotating the rear and front cam members 38,40 against the biasing force of the spring 34. This forces the pin 30 to move out of the slot 52, thereby allowing the saw blade 24 to be pulled from the slot 52.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A reciprocating tool comprising:

a housing;

a spindle mounted for reciprocating movement within said housing and having an end adapted to receive a saw blade; and a blade clamp mechanism connected to said spindle and adapted to attach the saw blade to said spindle, said blade clamp mechanism including an actuating member mounted on said end of said spindle and capable of moving relative to said spindle between an engaged position and a disengaged position, and a locking member operatively associated with said actuating member and moveable relative to said spindle between a locked position that locks the saw blade to said spindle and an unlocked position that releases the saw blade, wherein movement of said actuating member from the disengaged position to the engaged position results in forced movement of said locking member from the unlocked position to the locked position, and wherein movement of said actuating member from the engaged position to the disengaged position results in forced movement of said locking member from the locked position to the unlocked position;

wherein said actuating member includes an outer cam surface and an inner cam surface, and wherein said locking member includes an outer follower surface adapted to be driven by said outer cam surface and an inner follower surface adapted to be driven by said inner cam surface.

2. The reciprocating saw of claim 1, wherein said locking member includes a shoulder portion adapted to engage said inner cam surface.

3. The reciprocating tool of claim 1, wherein said actuating member includes an outer gripping surface having a unidirectional pattern that facilitates gripping and moving said actuating member toward the disengaged position.

4. The reciprocating saw of claim 1, wherein said spindle defines an axial direction, and wherein said inner cam surface includes a front portion and a rear portion axially spaced from said front portion.

5. The reciprocating saw of claim 4, wherein said locking member is positioned between said front portion and said rear portion.

6. The reciprocating tool of claim 1, wherein said spindle includes an opening, and wherein said locking member includes a body portion slidably positioned within said opening, and a head portion on an end of said body portion, said head portion being larger in cross section than said body portion.

7. The reciprocating tool of claim 6, wherein said body portion is substantially round in cross section and said head portion is substantially square in cross section.

8. A reciprocating tool comprising:

a housing;

a spindle mounted for reciprocating movement within said housing and having an end adapted to receive a saw blade; and a blade clamp mechanism connected to said spindle and adapted to attach the saw blade to said spindle, said blade clamp mechanism including an actuating member mounted on said end of said spindle and capable of moving relative to said spindle between an engaged position and a disengaged position, said actuating member including a first actuating portion and a second actuating portion, and a locking member engaged by said actuating member and moveable relative to said spindle between a locked position, in which the saw blade is locked to said spindle, and an unlocked position, in which the saw blade is released, said locking member including a first locking member portion and a second locking member portion, wherein movement of said actuating member from the disengaged position to the engaged position causes engagement of said first actuating portion and said first locking member portion to force movement of said locking member from the unlocked position to the locked position, and wherein movement of said actuating member from the engaged position to the disengaged position causes engagement of said second actuating portion and said second locking member portion to force movement of said locking member from the locked position to the unlocked position.

9. The reciprocating tool of claim 8, wherein said actuating member includes an outer gripping surface having a unidirectional pattern that facilitates gripping and moving said actuating member toward the disengaged position.

10. The reciprocating tool of claim 8, wherein said spindle includes an opening, and wherein said locking member includes a body portion slidably positioned within said opening, and a head portion on an end of said body portion, said head portion being larger in cross section than said body portion.

11. The reciprocating tool of claim 10, wherein said body portion is substantially round in cross section and said head portion is substantially square in cross section.

12. The reciprocating tool of claim 8, wherein said actuating member includes an outer cam surface and an inner cam surface providing said first actuating portion and said second actuating portion, respectively, and wherein said locking member includes an outer follower surface providing said first locking member portion and adapted to be driven by said outer cam surface and an inner follower surface providing said second locking member portion and adapted to be driven by said inner cam surface.

13. The reciprocating tool of claim 12, wherein said locking member includes a shoulder portion adapted to engage said inner cam surface.

14. The reciprocating tool of claim 12, wherein said spindle defines an axial direction, and wherein said inner cam surface includes a front portion and a rear portion axially spaced from said front portion.

15. The reciprocating tool of claim 14, wherein said locking member is positioned between said front portion and said rear portion.

* * * * *